(12) United States Patent
Masuda et al.

(10) Patent No.: US 11,915,882 B2
(45) Date of Patent: Feb. 27, 2024

(54) CERAMIC ELECTRONIC DEVICE AND MANUFACTURING METHOD OF THE SAME

(71) Applicant: TAIYO YUDEN CO., LTD., Tokyo (JP)

(72) Inventors: Hidetoshi Masuda, Takasaki (JP); Kotaro Mizuno, Takasaki (JP); Koichi Tsukagoshi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 60 days.

(21) Appl. No.: 17/899,444

(22) Filed: Aug. 30, 2022

(65) Prior Publication Data

US 2023/0084921 A1 Mar. 16, 2023

(30) Foreign Application Priority Data

Sep. 16, 2021 (JP) ................. 2021-150703

(51) Int. Cl.
| | |
|---|---|
| *H01G 4/30* | (2006.01) |
| *H01G 4/012* | (2006.01) |
| *C04B 35/64* | (2006.01) |
| *H01G 4/12* | (2006.01) |
| *C04B 35/468* | (2006.01) |
| *H01G 4/008* | (2006.01) |

(52) U.S. Cl.
CPC ........... *H01G 4/30* (2013.01); *C04B 35/4682* (2013.01); *C04B 35/64* (2013.01); *H01G 4/008* (2013.01); *H01G 4/012* (2013.01); *H01G 4/1227* (2013.01)

(58) Field of Classification Search
CPC .... C04B 35/4682; C04B 35/64; H01G 4/008; H01G 4/012; H01G 4/1227; H01G 4/30
See application file for complete search history.

(56) References Cited

U.S. PATENT DOCUMENTS

| | | | | |
|---|---|---|---|---|
| 2019/0304695 | A1* | 10/2019 | Kim | H01G 4/30 |
| 2020/0066454 | A1* | 2/2020 | Cha | H01G 4/0085 |
| 2021/0098191 | A1* | 4/2021 | Saito | H01G 4/1227 |
| 2022/0139619 | A1* | 5/2022 | Lee | H01G 4/12 361/301.4 |
| 2022/0139630 | A1* | 5/2022 | Yamada | H01G 4/008 361/321.2 |
| 2022/0384109 | A1* | 12/2022 | Masuda | H01G 4/008 |
| 2023/0094498 | A1* | 3/2023 | Mizuno | H01G 4/008 361/301.4 |
| 2023/0290576 | A1* | 9/2023 | Mizuno | H01G 4/2325 |
| 2023/0298820 | A1* | 9/2023 | Masuda | H01G 4/012 361/301.4 |
| 2023/0317373 | A1* | 10/2023 | Suemasa | H01G 4/0085 361/301.4 |

FOREIGN PATENT DOCUMENTS

| | | | | |
|---|---|---|---|---|
| JP | 2003007562 | A | * | 1/2003 |
| JP | 2003007562 | A | | 1/2003 |

\* cited by examiner

*Primary Examiner* — Nathan Milakovich
(74) *Attorney, Agent, or Firm* — Law Office of Katsuhiro Arai

(57) ABSTRACT

A ceramic electronic device includes a multilayer chip in which a dielectric layer and an internal electrode layer are alternately stacked. Concentration peaks of two or more types of metals different from a main component metal of the internal electrode layer exist at different positions in a stacking direction of the dielectric layer and the internal electrode layer, between the dielectric layer and the internal electrode layer.

10 Claims, 11 Drawing Sheets

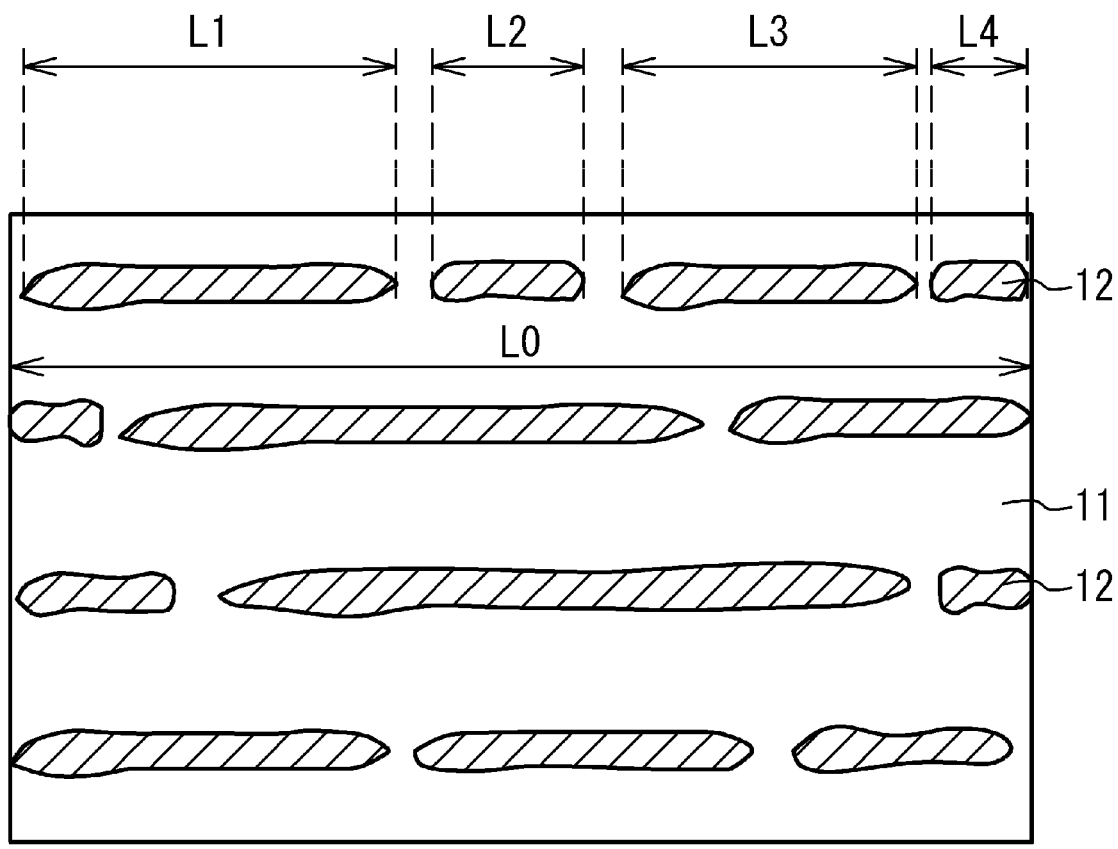

EXAMPLE 1

EXAMPLE 4

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2021-150703, filed on Sep. 16, 2021, the entire contents of which are incorporated herein by reference.

FIELD

A certain aspect of the present invention relates to a ceramic electronic device and a manufacturing method of the ceramic electronic device.

BACKGROUND

With the miniaturization of electronic devices, further miniaturization of ceramic electronic devices such as multilayer ceramic capacitors mounted on electronic apparatuses is required. In order to increase the capacity value, which is a basic characteristic, methods of (1) increasing the dielectric constant of dielectric layers, (2) increasing a specified capacity area, and (3) reducing thicknesses of the dielectric layers are considered. When the dielectric constant and the element size are the defaults, the thinner the dielectric layer is, the larger the capacity value per layer is. In addition, by thinning the dielectric layer and the internal electrode layer, the number of stacked layers can be increased within a predetermined thickness, which is advantageous.

SUMMARY OF THE INVENTION

According to an aspect of the present invention, there is provided a ceramic electronic device including a multilayer chip in which a dielectric layer and an internal electrode layer are alternately stacked, wherein concentration peaks of two or more types of metals different from a main component metal of the internal electrode layer exist at different positions in a stacking direction of the dielectric layer and the internal electrode layer, between the dielectric layer and the internal electrode layer.

According to another aspect of the present invention, there is provided a manufacturing method of a ceramic electronic device including: forming a plurality of stack units by forming each of internal electrode patterns on each of dielectric green sheets; forming a multilayer structure by stacking the plurality of stack units; and firing the multilayer structure, wherein metal patterns each of which is made of one of two or more types of metals different from a main component metal of the internal electrode pattern are formed on both main faces of the internal electrode pattern by sputtering, in the forming of the internal electrode pattern.

BRIEF DESCRIPTION OF THE DRAWINGS

FIG. 10 illustrates a continuity modulus;

DETAILED DESCRIPTION

On the other hand, when the dielectric layers are made thin, the electric field strength applied to the dielectric layers increases even at the same working voltage, so that the insulation reliability may decrease. Further, when the internal electrode layers are made thin, the continuity modulus of the internal electrode layers may decrease. As described above, the performance of the ceramic electronic component may be deteriorated.

On the other hand, by appropriately selecting a plurality of metal elements as the metal elements used for the internal electrode layers, it is possible to suppress the deterioration of the performance of the ceramic electronic component. However, even if a plurality of metal elements are simply contained in the internal electrode layers, there is a possibility that the deterioration of the performance of the ceramic electronic component may not be necessarily suppressed.

A description will be given of an embodiment with reference to the accompanying drawings.

Figure 1:
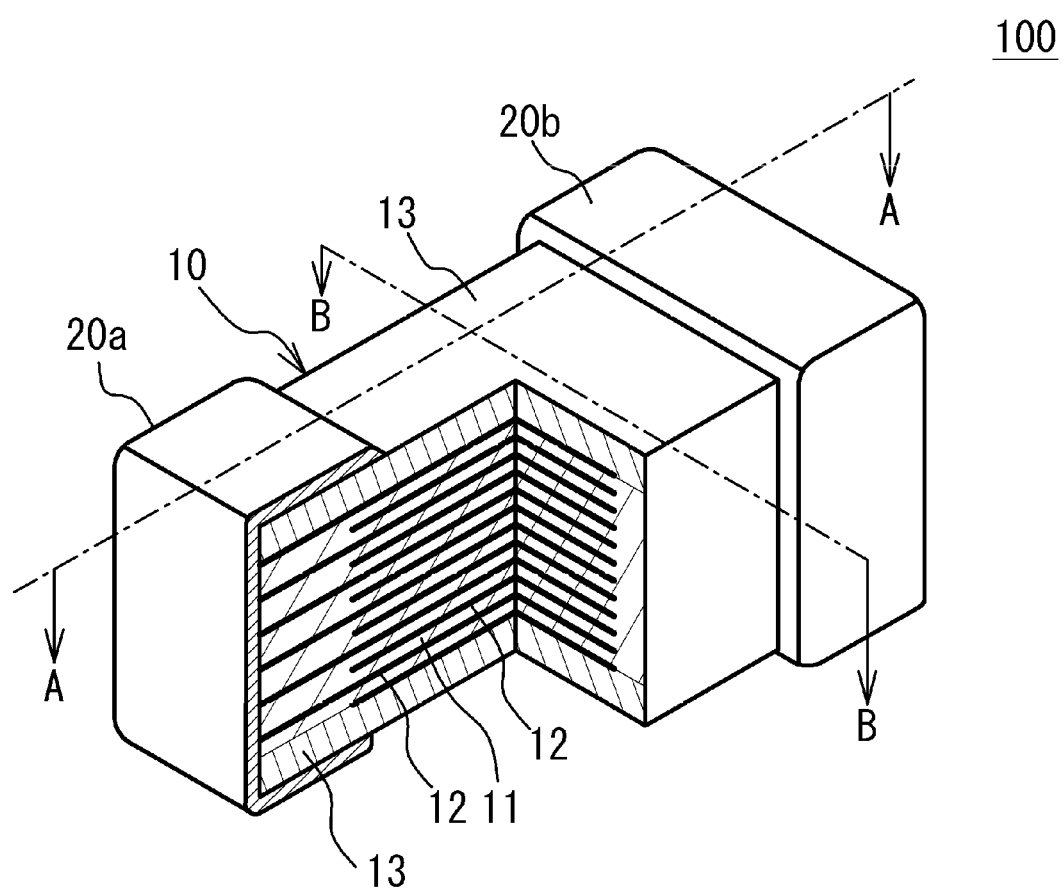
FIG. 1 illustrates a perspective view of a multilayer ceramic capacitor in which a cross section of a part of the multilayer ceramic capacitor is illustrated.
Figure 2:
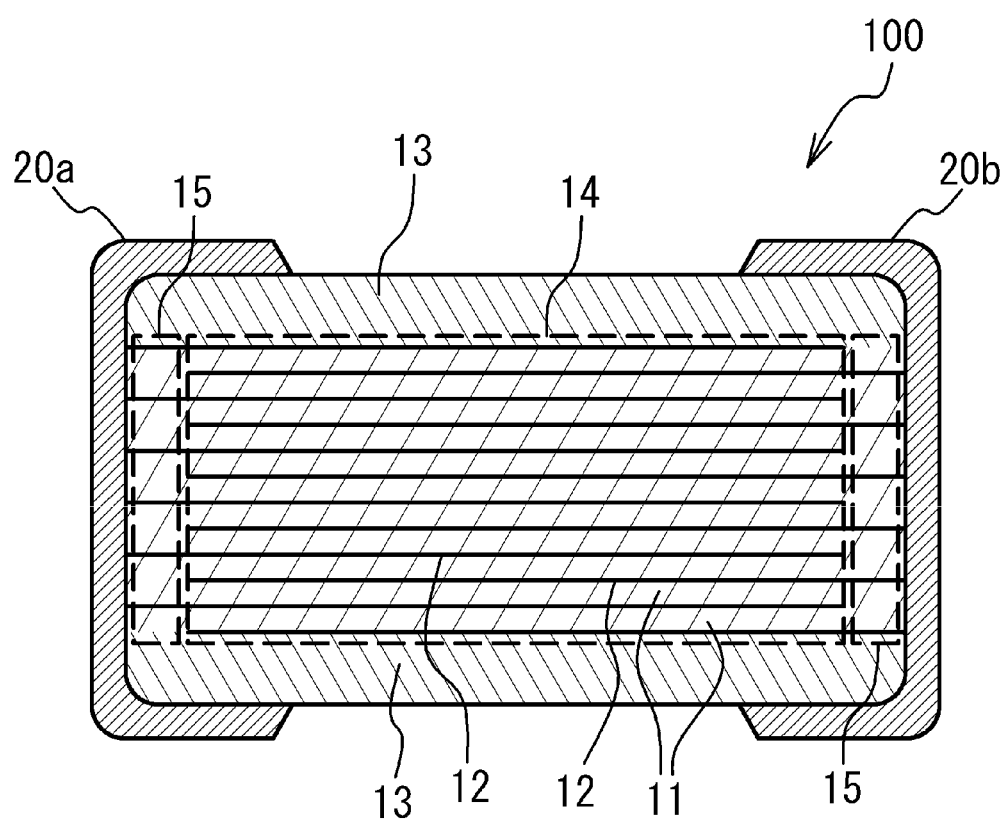
FIG. 2 illustrates a cross sectional view taken along a line A-A of FIG. 1.
Figure 3:
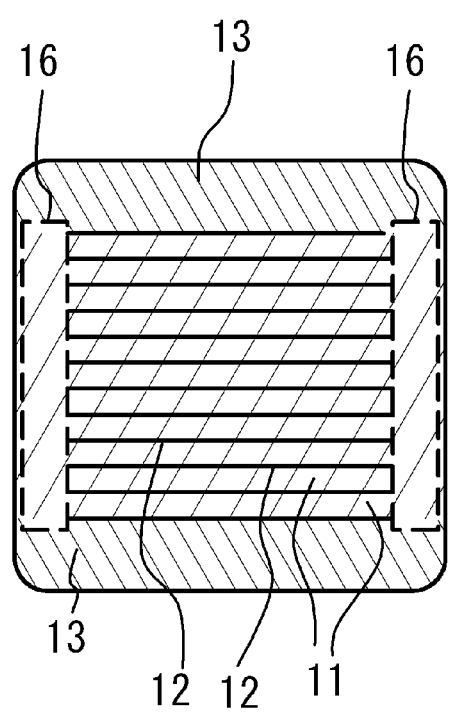
FIG. 3 illustrates a cross sectional view taken along a line B-B of FIG. 1.

(First Embodiment) FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

It is preferable to form the dielectric layer 11 thinly in order to reduce the size and capacity of the multilayer ceramic capacitor 100. For example, the thickness of the dielectric layer 11 per layer is 0.05 μm or more and 5 μm or less, or 0.1 μm or more and 3 μm or less, or 0.2 μm or more and 1 μm or less, or 0.6 μm or less. The thickness of the dielectric layer 11 is determined by observing the cross section of the multilayer ceramic capacitor 100 with an SEM (scanning electron microscope) and measuring the thickness of each of 10 different layers of the dielectric layer 11 by 10 points, and calculating an average value of the thicknesses of all the measurement points.

Figure 4:
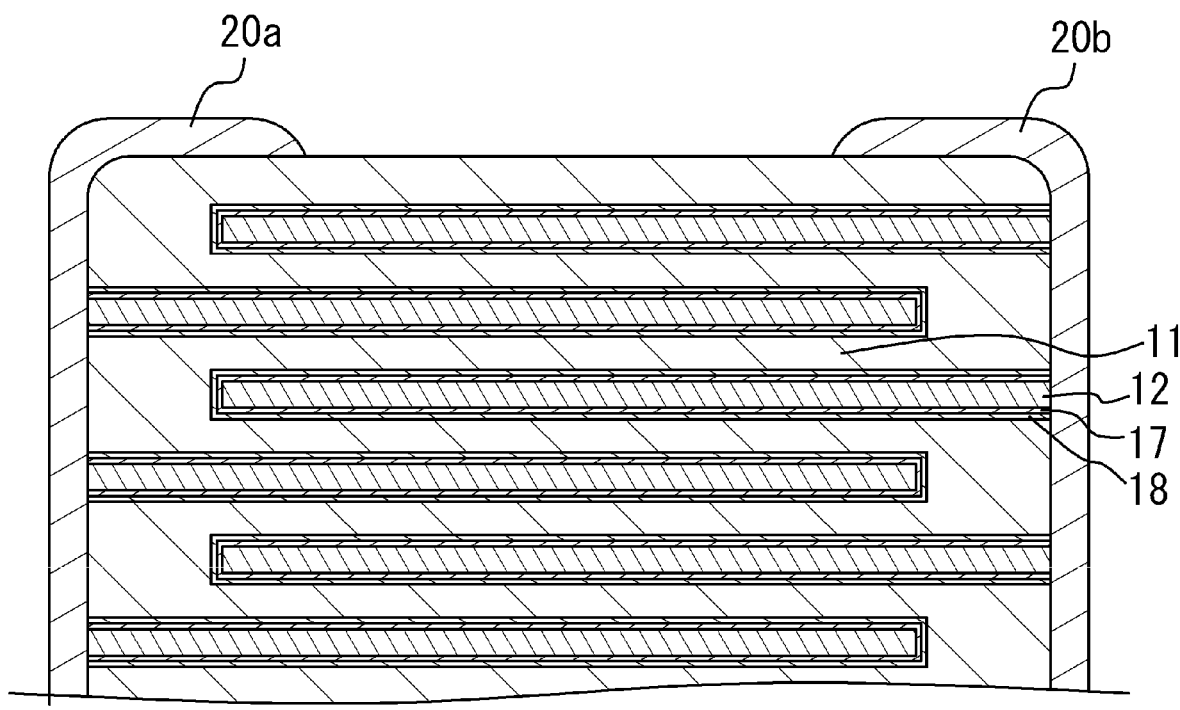
FIG. 4 is a diagram for explaining details of vicinity of a boundary between an internal electrode layer and a dielectric layer.

FIG. 4 is a diagram for explaining the details of the vicinity of the boundary between the internal electrode layer 12 and the dielectric layer 11. As illustrated in FIG. 4, the internal electrode layer 12 is covered with a first coating layer 17. Further, the first coating layer 17 is covered with a second coating layer 18. For example, the first coating layer 17 is formed on a first main surface which is one main surface (upper main surface in FIG. 4) of the internal electrode layer 12, and the second coating layer 18 is formed on the first coating layer 17. Further, the first coating layer 17 is formed under a second main surface which is the other main surface (lower main surface in FIG. 4) of the internal electrode layer 12, and the second coating layer 18 is formed under the first coating layer 17. The first coating layer 17 does not necessarily have to cover the entire first main surface and the second main surface of the internal electrode layer 12, and partially covers the first main surface and the second main surface of the internal electrode layer 12. Further, the second coating layer 18 does not necessarily have to cover the entire first coating layer 17, and may partially cover the first coating layer 17.

The first coating layer 17 is a layer containing a relatively large amount of a first metal different from the main component metal of the internal electrode layer 12. The second coating layer 18 is also a layer containing a relatively large amount of a second metal different from the main component metal of the internal electrode layer 12. The first metal and the second metal are different from each other. In each of the internal electrode layer 12, the first coating layer 17, and the second coating layer 18, not only a single metal is present, but each metal is partially diffused into each layer. The main component metal of the internal electrode layer 12 may be a base metal such as nickel (Ni) or copper (Cu), or may be a noble metal or the like.

Figure 5A:
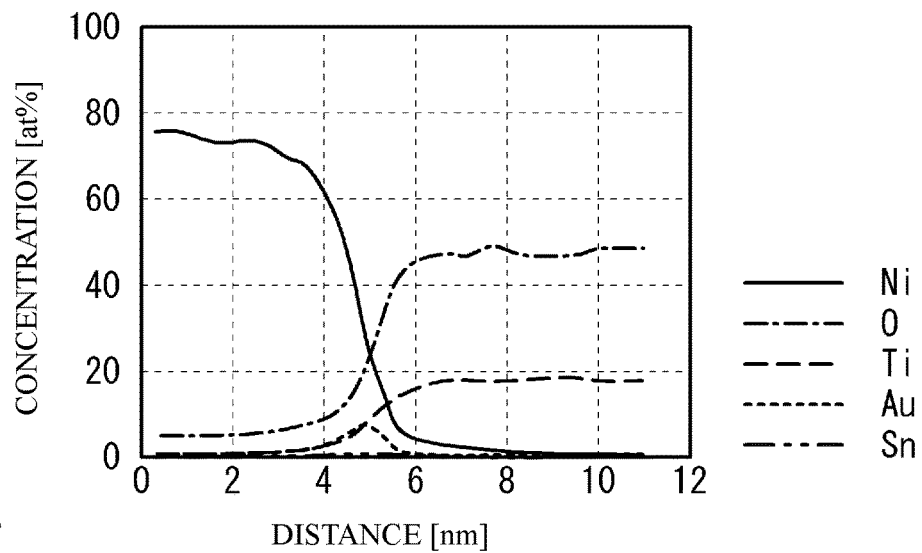
FIG. 5A to FIG. 5C illustrate analysis results when a concentration of each component element is line-analyzed for each sample point along a stacking direction of a dielectric layer and an internal electrode layer in a TEM image.
Figure 5B:
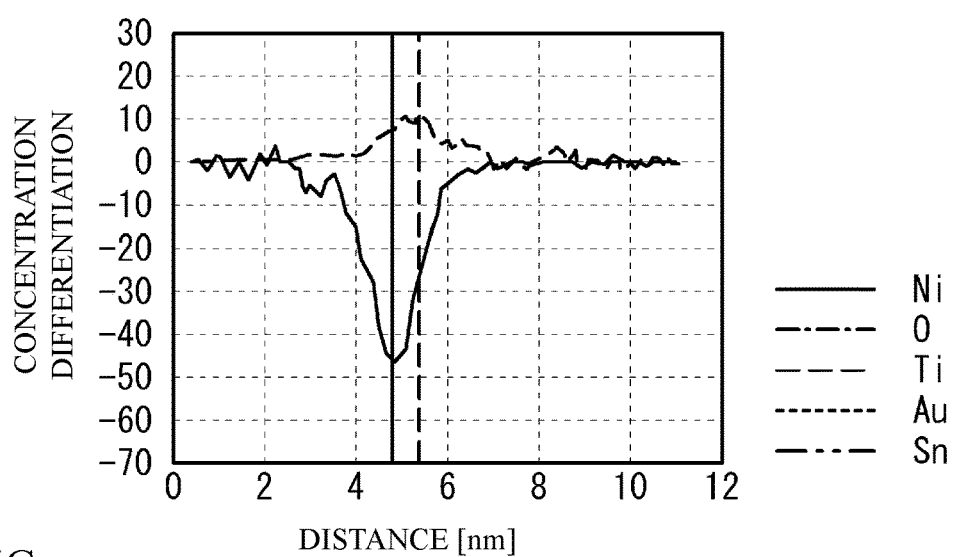
Figure 5C:
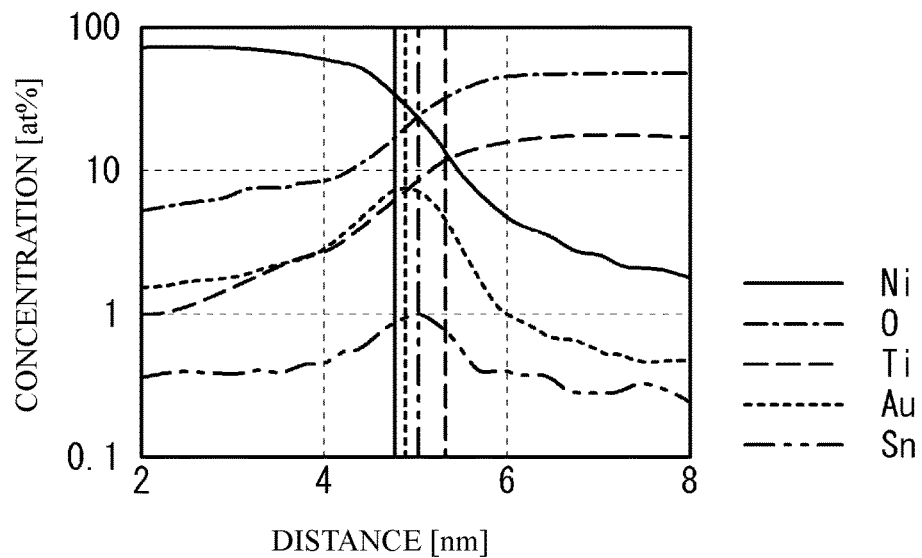

FIG. 5A to FIG. 5C illustrate the analysis results when the concentration of each component element is line-analyzed for each sample point along the stacking direction of the dielectric layer 11 and the internal electrode layer 12 in a TEM image. In the examples of FIG. 5A to FIG. 5C, as an example, Ni is used as the main component metal of the internal electrode layer 12, the first coating layer 17 contains a relatively large amount of gold (Au), and the second coating layer 18 contains a relatively large amount of tin (Sn), and barium titanate is used as the main component ceramic of the dielectric layer 11.

In FIG. 5A, the horizontal axis indicates the distance in the stacking direction, and the vertical axis indicates the concentration (at %) of each component. "0 nm" on the horizontal axis indicates the position expected to be the interface between the internal electrode layer 12 and the first coating layer 17. As the distance on the horizontal axis becomes larger, the position approaches the dielectric layer 11 in the stacking direction. As illustrated in FIG. 5A, at the distance of "0 nm", the concentration of Ni, which is the main component metal of the internal electrode layer 12, is the highest. As the position approaches the dielectric layer 11, the Ni concentration decreases, peaks appear in the Au concentration and Sn concentration, and the titanium (Ti) concentration and the oxygen (O) concentration increase. In the example of FIG. 5A, in order to reduce noise, 9 points are averaged and smoothed.

FIG. 5B shows the results of differentiating the Ni concentration and the Ti concentration in FIG. 5A. By specifying the steepest change point, the interface of the internal electrode layer 12 and the interface of the dielectric layer 11 can be specified. In the example of FIG. 5B, the position where the differential value of the Ni concentration is the smallest is the interface of the internal electrode layer 12. Further, the position where the differential value of the Ti concentration is the largest is the interface of the dielectric layer 11. A large amount of Au and Sn are present between the interface of the dielectric layer 11 and the interface of the internal electrode layer 12.

FIG. 5C is a logarithmic diagram indicating the vertical axis of the result of FIG. 5A. As illustrated in FIG. 5C, an Au concentration peak and a Sn concentration peak appear between the interface of the dielectric layer 11 and the interface of the internal electrode layer 12. The peak of Au concentration is located on the interface side of Ni with respect to the peak of Sn concentration. The peak of Sn concentration is located on the interface side of Ti with respect to the peak of Au concentration. As described above, between the interface of the dielectric layer 11 and the interface of the internal electrode layer 12, the concentration peak of the first metal which is contained in the first coating layer with a relatively large amount, and the concentration peak of the second metal which is contained in the second coating layer 18 with a relatively large amount exist at different positions in the stacking direction between the dielectric layer 11 and the internal electrode layer 12. Specifically, the concentration peak of the first metal is located on the interface side of the internal electrode layer 12, and the concentration peak of the second metal is located on the interface side of the dielectric layer 11.

According to such a configuration, the effect of the first metal and the effect of the second metal are achieved individually. For example, when the first metal achieves the effect of suppressing the decrease in reliability of the dielectric layer 11 and the second metal achieves the effect of suppressing the decrease in the continuity modulus of the internal electrode layer 12, the effect of suppressing the decrease in reliability is increased and the effect of suppressing the decrease in the continuity modulus is increased compared to the case where an alloy layer in which the first metal and the second metal layer are uniformly mixed is provided. Further, when the first metal achieves the effect of suppressing the decrease in the reliability of the dielectric layer 11 and the second metal also achieves the effect of suppressing the decrease in the reliability of the dielectric layer 11, the effect of suppressing a decrease in reliability is enhanced compared to the case where an alloy layer in which the first metal and the second metal layer are uniformly mixed is provided. In this way, by achieving the effect of the first metal and the effect of the second metal individually, it is possible to suppress the deterioration of the performance of the multilayer ceramic capacitor 100. This effect is remarkably achieved when the dielectric layer 11 is formed thin (for example, 0.6 μm or less) and the insulating property is not sufficiently guaranteed. The usage amount of the noble metal can be reduced by combining a noble metal and a base metal as the first metal and the second metal, or by combining base metals.

When Ni or Cu is used as the main component metal of the internal electrode layer 12, for example, arsenic (As), Au, cobalt (Co), chromium (Cr), Cu, iron (Fe), indium (In), iridium (Ir), magnesium (Mg), osmium (Os), palladium (Pd), platinum (Pt), renium (Re), rhodium (Rh), ruthenium (Ru), Serene (Se), Sn, Tellurium (Te), Tungsten (W), Ittrium (Y), Zinc (Zn) and the like may be used as the metal that suppresses a decrease in insulation reliability of the dielectric layer 11.

When Ni or Cu is used as the main component metal of the internal electrode layer 12, for example, silver (Ag), Cr, Ir, Mg, molybdenum (Mo), Os, Pd, Pt, Re, Rh, Ru, Y, or W may be used as a metal that suppresses a decrease in the continuity modulus of the internal electrode layer 12.

When Ni or Cu is used as the main component metal of the internal electrode layer 12, for example, tantalum (Ta), Ti, or the like may be used as a metal having an effect of barriering diffusion between the internal electrode layer 12 and the dielectric layer 11.

When Ni or Cu is used as the main component metal of the internal electrode layer 12, for example, Cr, Ta, Ti or the like may be used as a metal for ensuring the adhesion between the internal electrode layer 12 and the dielectric layer 11.

When Ni or Cu is used as the main component metal of the internal electrode layer 12 and perovskite oxide such as barium titanate is used as the main component ceramic of the dielectric layer 11, for example, Cu or the like may be used as a metal for suppressing the lattice inconsistency between the internal electrode layer 12 and the dielectric layer 11.

In order to form a single layer of the first metal, an interval of at least the atomic radius of the first metal or more is required. Therefore, it is preferable to set a lower limit for the interval from the interface of the internal electrode layer 12 to the concentration peak of the first metal in the stacking direction. On the other hand, when the interval is too large, the effect will begin to saturate. Therefore, it is preferable to set an upper limit for the interval. In the stacking direction, the interval from the interface of the internal electrode layer 12 to the concentration peak of the first metal is, for example, 0.1 nm or more and 2 nm or less, 0.1 nm or more and 1.5 nm or less, and 0.1 nm or more and 1 nm or less. In the stacking direction, the interval from the concentration peak of the first metal to the concentration peak of the second metal is, for example, 0.1 nm or more and 2 nm or less, 0.1 nm or more and 1.5 nm or less, or 0.1 nm or more and 1 nm or less. In the stacking direction, the distance from the concentration peak of the second metal to the interface of the dielectric layer 11 is, for example, 0.1 nm or more and 2 nm or less, 0.1 nm or more and 1.5 nm or less, or 0.1 nm or more and 1 nm or less. In the above, the case where there are two types of concentration peaks is described, but the case where a plurality of peaks are present also has the same interval.

The thickness of the internal electrode layer 12 is, for example, 10 nm or more and 1000 nm or less, 20 nm or more and 500 nm or less, and 50 nm or more and 300 nm or less. The thickness of the internal electrode layer 12 is determined by observing the cross section of the multilayer ceramic capacitor 100 with SEM, measuring the thickness of each of the 10 different internal electrode layers 12 by 10 points, and calculating the average value of the thicknesses of all the measurement points.

The number of metals in which the concentration peaks appear at different positions in the stacking direction between the internal electrode layer 12 and the dielectric layer 11 is not limited to two. Concentration peaks of three or more metals may appear at different positions in the stacking direction between the internal electrode layer 12 and the dielectric layer 11. In this case, the effects of each of the three or more metals can be obtained.

Figure 6:
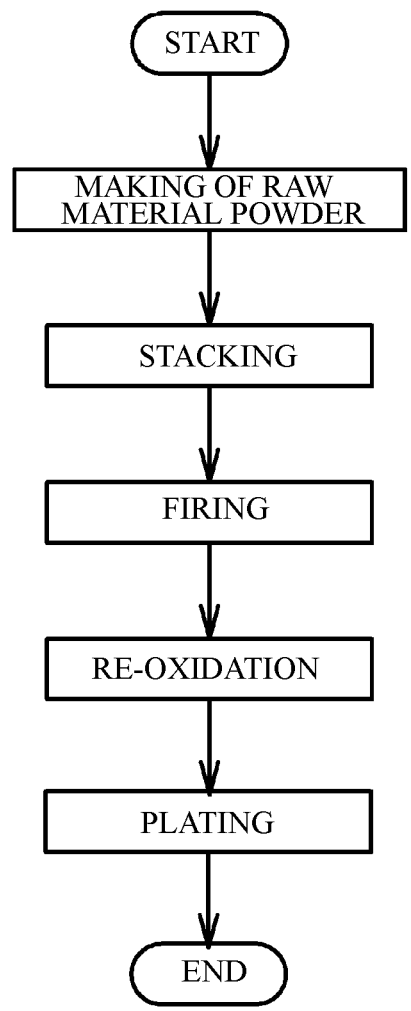
FIG. 6 illustrates a manufacturing method of a multilayer ceramic capacitor

Next, a description will be given of a manufacturing method of the multilayer ceramic capacitors 100. FIG. 6 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of Mg, Mn (manganese), V (vanadium), Cr (chromium) or a rare earth element (Y, Sm (samarium), Eu (europium), Gd (gadolinium), Tb (terbium), Dy (dysprosium), Ho (holmium), Er (erbium), Tm (thulium) and Yb (ytterbium)), or an oxide of Co, Ni, Li (lithium), B (boron), Na (sodium), K (potassium) and Si (silicon). The additive compound may be a glass including cobalt, nickel, lithium, boron, sodium, potassium or silicon.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the grain diameter of the resulting ceramic power may be adjusted by combining the crushing and classifying. With the processes, a dielectric material is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Figure 7A:
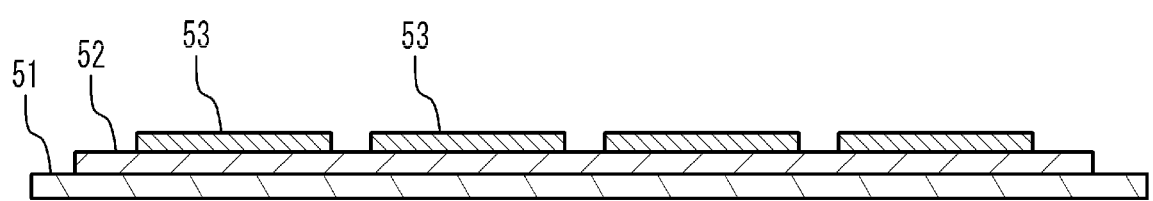
FIG. 7A and FIG. 7B illustrate a stacking process.

Next, as illustrated in FIG. 7A, an internal electrode pattern 53 is formed on the dielectric green sheet 52. In FIG. 7A, as an example, four parts of the internal electrode pattern 53 are formed on the dielectric green sheet 52 and are spaced from each other. The dielectric green sheet 52 on which the internal electrode pattern 53 is formed is a stack unit.

Figure 7B:
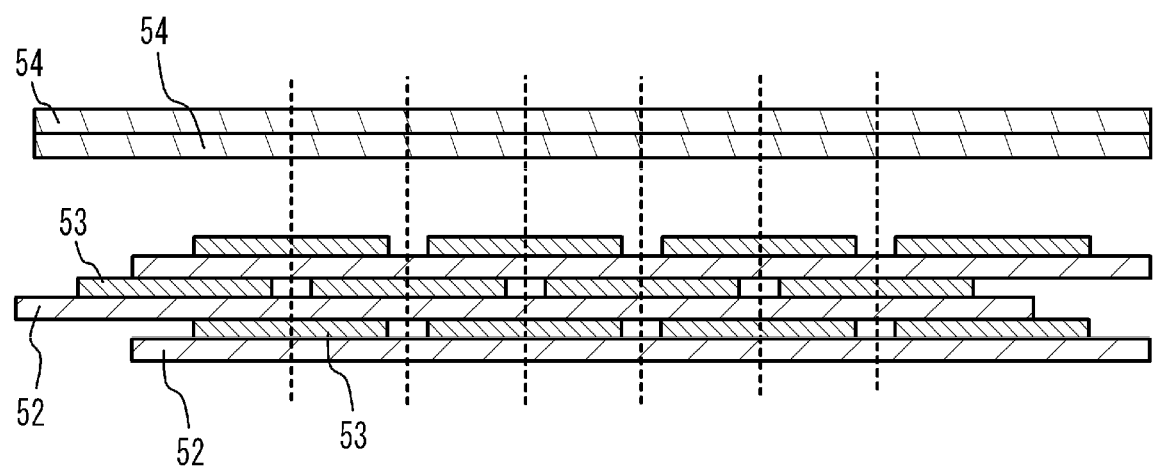

Next, the dielectric green sheets 52 are peeled from the base materials 51. As illustrated in FIG. 7B, the stack units are stacked.

A predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 7B, the multilayer structure is cut along a dotted line. The components of the cover sheet 54 may be the same as those of the dielectric green sheet 52. Additives of the cover sheet 54 may be different from those of the dielectric green sheet 52.

(Firing process) The binder is removed from the ceramic multilayer structure in $N_2$ atmosphere. A metal paste to be the base layer of the external electrodes 20a and 20b is applied to the both end faces of the ceramic multilayer structure by a dipping method. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C.

(Re-oxidizing process) After that, a re-oxidizing process may be performed in $N_2$ gas atmosphere in a temperature range of 600 degrees C. to 1000 degrees C.

(Plating process) After that, by a plating process, plated layers of Cu, Ni, Sn or the like may be formed on the external electrodes 20a and 20b.

Figure 8:
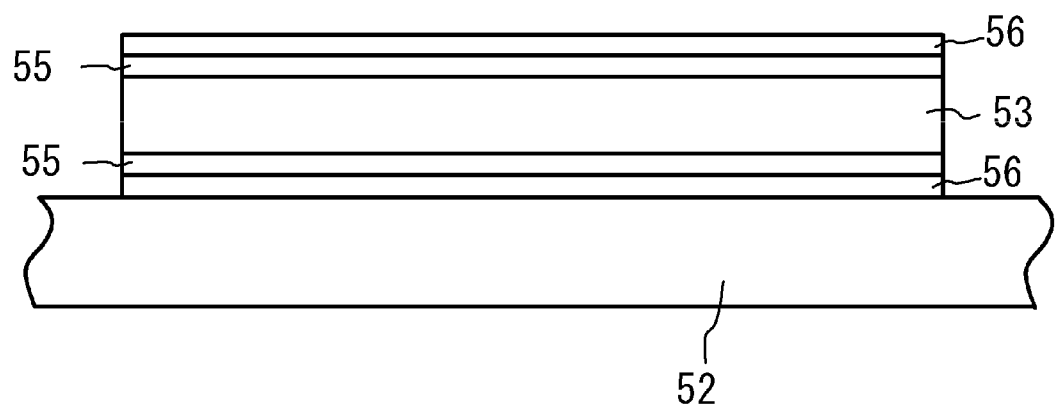
FIG. 8 is a diagram for explaining details of film formation of an internal electrode pattern on a dielectric green sheet.

FIG. 8 is a diagram for explaining in detail the film formation of the internal electrode pattern 53 on the dielectric green sheet 52. As illustrated in FIG. 8, on both main faces of the internal electrode pattern 53, a first pattern 55 of the first metal which is contained in the first coating layer 17 with a relatively large amount is formed by sputtering. A second pattern 56 of the second metal which is contained in the second coating layer 18 with a relatively large amount is formed on the first pattern 55 by sputtering. For example, the second pattern 56 is formed on the dielectric green sheet 52 by sputtering. Next, the first pattern 55 is formed on the second pattern 56 by sputtering. Next, the internal electrode pattern 53 is formed on the first pattern 55 by sputtering. Next, the first pattern 55 is formed on the internal electrode pattern 53 by sputtering. Next, the second pattern 56 is formed on the first pattern 55 by sputtering.

According to the method for manufacturing the multilayer ceramic capacitor 100 according to the present embodiment, by forming each pattern into a film by sputtering as illustrated in FIG. 8, it is possible to prevent the metals in each layer from being mixed with each other. As a result, even if the metals are diffused with each other in the firing step, the structure illustrated in FIG. 4 can be obtained in the vicinity of the interface of the internal electrode layer 12 obtained after the firing step. In this case, when the concentration of each element is line-analyzed for each sample point along the stacking direction in the TEM image, the concentration peak of the first metal which is contained in the first coating layer 17 with a relatively large amount and the concentration peak of the second metal which is contained in the second coating layer 18 with a relatively large amount are present at different positions between the interface of the internal electrode layer 12 and the interface of the dielectric layer 11. As a result, the effect of the first metal and the effect of the second metal are achieved individually.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

(Example 1) Additives were added to barium titanate powder, and the mixture was sufficiently wet-mixed and pulverized with a ball mill to obtain a dielectric material. A butyral-based organic binder was added to the dielectric material, toluene and ethyl alcohol were added as solvents, and a dielectric green sheet was applied onto a PET substrate by a doctor blade method. A pattern having a thickness of 200 nm was formed on the surface of the dielectric green sheet by sputtering. In order to provide a coating layer of a dissimilar metal on the surface of the Ni layer of the internal electrode pattern, the Au layer and the Sn layer were individually formed before and after the formation of the Ni layer. The thickness of the Au layer and the Sn layer was 1 nm on both the front and back sides, and the thickness of the Ni layer was 196 nm. For patterning, a mask method using a metal mask was adopted. 100 layers of dielectric green sheets on which the internal electrode pattern was formed are stacked so that the internal electrode patterns were alternately displaced, cut to a predetermined size, and metal conductive paste for the external electrode was applied to the two end faces where the internal electrode pattern was exposed. After that, the resulting structure was fired. Thus, t multilayer ceramic capacitor was obtained.

For the obtained multilayer ceramic capacitor, the composition near the boundary between the dielectric layer and the internal electrode layer was line-analyzed by STEM-EDS (scanning transmission electron microscope). The variation of the measurement data was averaged by the averaging process of about 9 points. In the region that crosses the boundary, the position where the concentration change was the steepest was defined as the interface. That is, the position indicating the maximum/minimum value of the distance differential of the concentration was set as the interface. The interface positions of Ni and Ti extracted by the above operation were different from each other, and the interval of them was about 0.5 nm. The concentrations of Au and Sn both had a local maximum peak value, and the peak position was located between the interfaces of Ni and Ti. The peak positions were different from each other, and in the case of this device, there was an interval of about 0.2 nm.

(Example 2) In an example 2, instead of the Sn layer having a thickness of 1 nm, an Fe layer having a thickness of 1 nm was formed by sputtering. Other conditions were the same as in the example 1. In the example 2, the concentration peaks of Au and Fe were confirmed at different positions between the interfaces of Ni and Ti.

(Example 3) In an example 3, a Cr layer having a thickness of 1 nm was formed by sputtering instead of the Sn layer having a thickness of 1 nm. Other conditions were the same as in the example 1. In the example 3, the concentration peaks of Au and Cr were confirmed at different positions between the interfaces of Ni and Ti.

(Example 4) In an example 4, three coating layers were provided. Before and after forming the Ni layer having a thickness of 194 nm, the Au layer of 1 nm, the Cr layer of 1 nm, and the Sn layer of 1 nm were formed by sputtering, respectively. Other conditions were the same as in the example 1. In the example 4, the concentration peaks of Au, Cr and Sn were confirmed at different positions between the interfaces of Ni and Ti.

(Comparative example 1) In a comparative example 1, when the internal electrode pattern was formed, 200 nm was formed only with Ni, and the coating layers of the Au layer and the Sn layer were not formed. Other conditions were the same as in the example 1.

(Comparative example 2) In a comparative example 2, when the internal electrode pattern was formed, a Ni layer of 198 nm was formed, and an Au layer of 1 nm was formed before and after the Ni layer was formed. Other conditions were the same as in the example 1.

Figure 9:
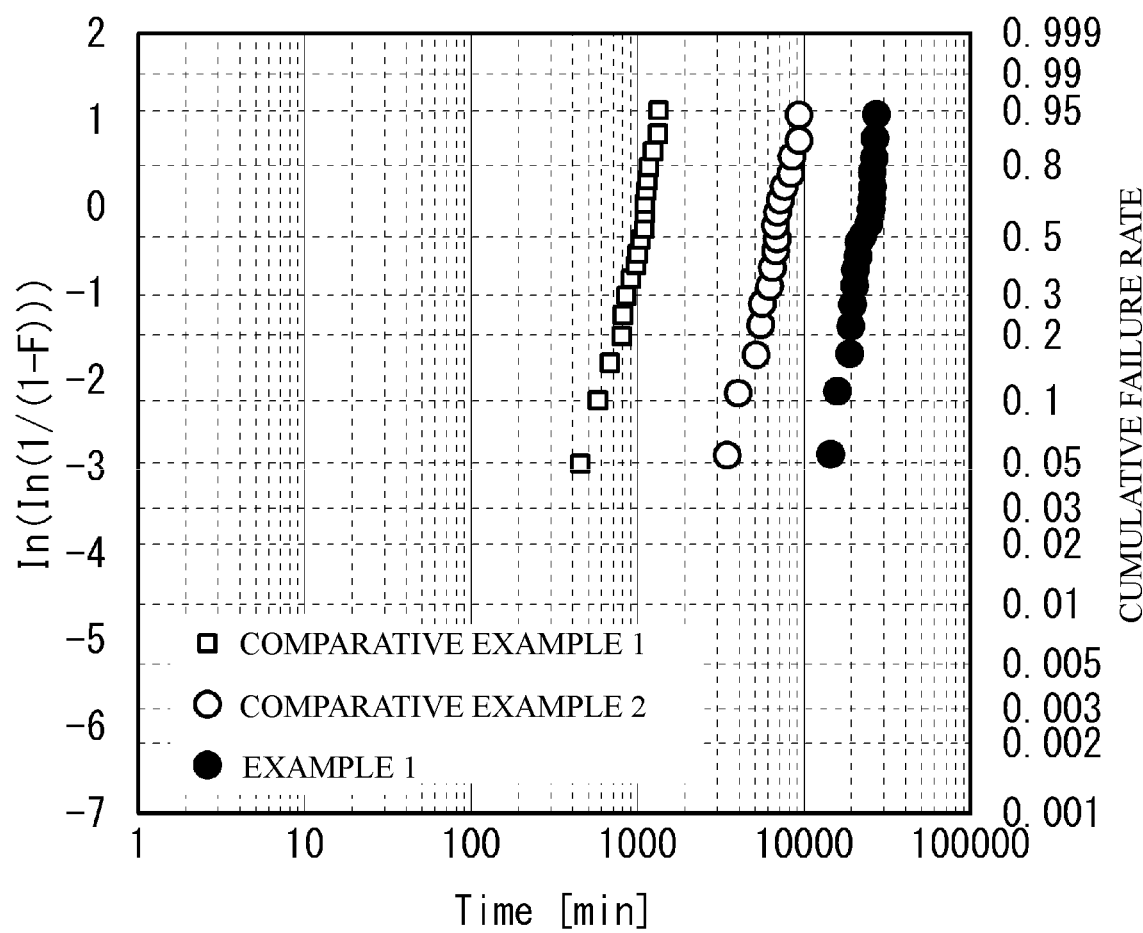
FIG. 9 is a Weibull plot diagram.

For the examples 1 to 4 and the comparative examples 1 and 2, a HALT (high acceleration life) test at 125° C./18 V was carried out, and the dielectric breakdown life was measured. FIG. 9 is a Weibull plot diagram showing the relationship between the time until failure and the cumulative failure rate for the example 1 and the comparative examples 1 and 2. As shown in FIG. 9, it can be seen that the dielectric breakdown life was extended in the example 1 and the comparative example 2 as compared with the comparative example 1. It is considered that this was because both Au and Sn were effective in improving the lifetime. Compared with the comparative example 2, the dielectric breakdown lifetime was further extended in the example 1. It is considered that this was because both the Au and Sn coating layers were formed into a film. However, since the difference between the dielectric breakdown lifetime of the comparative example 2 and the dielectric breakdown lifetime of the example 1 was larger than the difference between the dielectric breakdown lifetime of the comparative example 1 and the dielectric breakdown life of the comparative example 2, it is considered that the synergistic effect on the extension width was obtained by the presence of both Au and Sn concentration peaks at different positions between the dielectric layer and the internal electrode layer.

Regarding the examples 1 to 4 and the comparative examples 1 and 2, when the lifetime was one digit or more longer than the lifetime of the comparative example 1, the reliability was judged to be very good "double circle". When the lifetime was several times longer than the lifetime of the comparative example 1, the reliability was judged to be good "○", and when the lifetime was equal to or less than the lifetime of the comparative example 1, the reliability was judged to be poor "x".

Figure 11A:
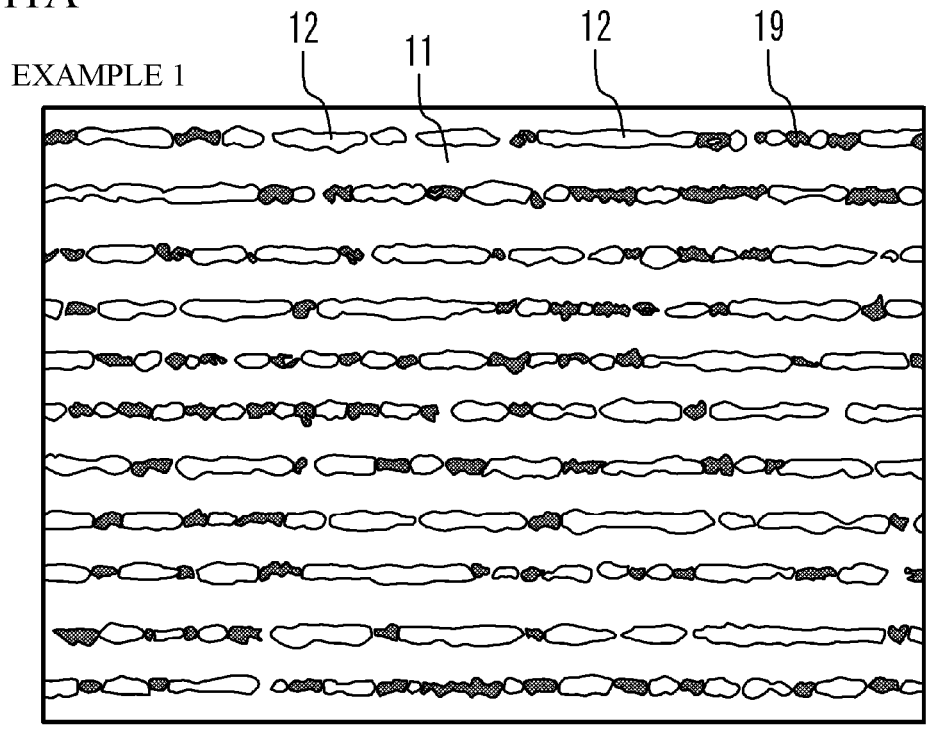
FIG. 11A is a cross-sectional SEM image of an example 1.
Figure 11B:
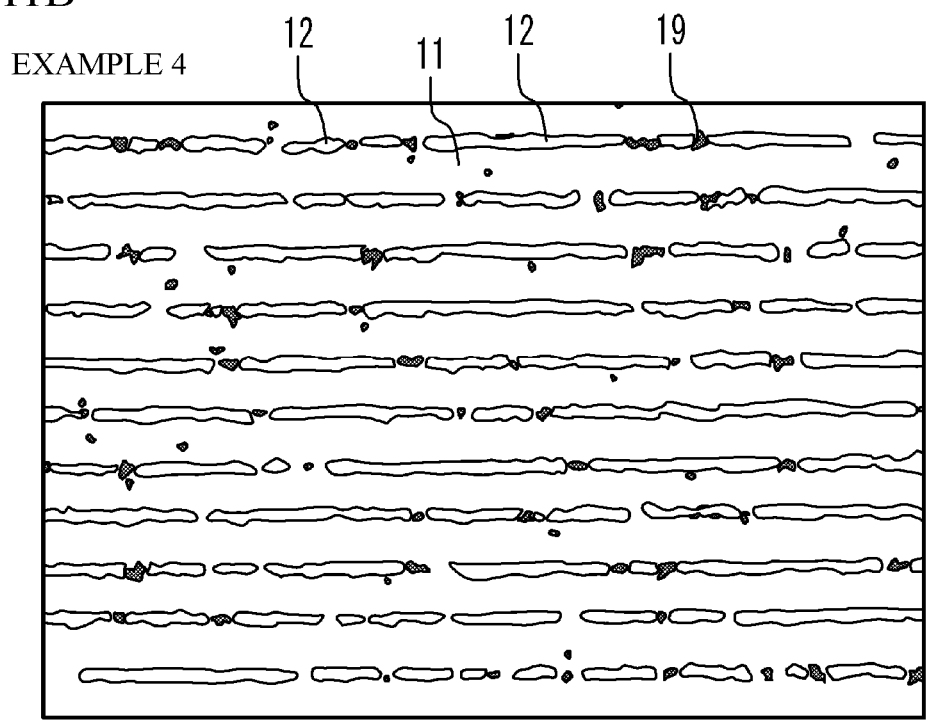
FIG. 11B is a cross-sectional SEM image of an example 4.

Next, the continuity modulus of the internal electrode layer was measured for the examples 1 to 4 and the comparative examples 1 and 2. FIG. 10 is a diagram showing the continuity modulus. As illustrated in FIG. 10, in the observation region of length L0 in the certain internal electrode layer 12, the lengths L1, L2, . . . , Ln of the metal portions were measured and totaled, and the ratio of the metal portions was obtained. ΣLn/L0 can be defined as the continuity modulus of the layer. FIG. 11A is a cross-sectional SEM image of the example 1. FIG. 11B is a cross-sectional SEM image of the example 4. In FIG. 11A and FIG. 11B, a shaded portion 19 is a interrupted portion of the internal electrode layer 12. Cr is known to have an effect on suppressing tearing of the internal electrode layer 12. From the comparison result between FIG. 11A and FIG. 11B, a clear difference in the continuity modulus of the internal electrode layer 12 could be confirmed, and the continuity modulus was improved by arranging Cr between the dielectric layer 11 and the internal electrode layer 12. In the example 1, the continuity modulus was measured to be 70%. In the example 2, the continuity modulus was measured to be 68%. In the example 3, the continuity modulus was measured to be 95%. In the example 4, the continuity modulus was measured to be 92%. In the comparative example 1, the continuity modulus was measured to be 75%. In the comparative example 2, the continuity modulus was measured to be 65%.

For the examples 1 to 4 and the comparative examples 1 and 2, at least when the reliability was judged to be very good "double circle", it was judged to be acceptable. Even if the reliability was judged to be good "○", when the continuity modulus exceeded 65%, it was judged to be acceptable. When the continuity modulus was 65% or less even if the reliability was judged to be good "○", or when the reliability was judged to be poor "x", it was judged to be rejected. The results are shown in Table 1.

TABLE 1

|  | INTERNAL ELECTRODE PATTERN | METAL USED FOR SPUTTERING | | | RELIABILITY | CONTINUITY MODULUS | EVALUATION |
|---|---|---|---|---|---|---|---|
| EXAMPLE 1 | Ni | Au | Sn | | ⊚ | 70% | OK |
| EXAMPLE 2 | Ni | Au | Fe | | ⊚ | 68% | OK |
| EXAMPLE 3 | Ni | Au | Cr | | ○ | 95% | OK |
| EXAMPLE 4 | Ni | Au | Cr | Sn | ⊚ | 92% | OK |
| COMPARATIVE EXAMPLE 1 | Ni | | | | X | 75% | NG |
| COMPARATIVE EXAMPLE 2 | Ni | Au | | | ○ | 65% | NG |

The examples 1 to 4 were determined to be acceptable. This is because, in the example 1, sufficient reliability was obtained because the concentration peaks of Au and Sn, which suppressed the decrease in insulation reliability, existed at different positions between the dielectric layer and the internal electrode layer. This is because, also in the example 2, sufficient reliability was obtained because the concentration peaks of Au and Fe, which suppressed the decrease in insulation reliability, existed at different positions between the dielectric layer and the internal electrode layer. In the example 3, Au and Cr were arranged between the dielectric layer and the internal electrode layer, and these concentration peaks were present at different positions, so that the reliability was improved and the continuity modulus was increased. In the example 4, sufficient reliability was obtained by having the concentration peaks of Au and Sn, which suppressed the decrease in insulation reliability, at different positions between the dielectric layer and the internal electrode layer. Further, it is considered that this was because the continuity modulus was increased because the concentration peaks of Cr were present at different positions. Regarding the film forming method by sputtering shown in each example, the order of sputtering of two or more kinds of metals may be changed.

On the other hand, the comparative example 1 was determined to be unacceptable. It is considered that this was because the metal that suppresses the deterioration of the insulation reliability was not arranged between the dielectric layer and the internal electrode layer, so that sufficient reliability could not be obtained. The comparative example 2 was determined to be unacceptable. It is considered that this was because only one kind of metal that suppressed the deterioration of insulation reliability was arranged between the dielectric layer and the internal electrode layer, so that sufficient reliability could not be obtained.

Although the embodiments of the present invention have been described in detail, it is to be understood that the various change, substitutions, and alterations could be made hereto without departing from the spirit and scope of the invention.

What is claimed is:

1. A ceramic electronic device comprising:
   a multilayer chip in which a dielectric layer and an internal electrode layer are alternately stacked,
   wherein concentration peaks of two or more types of metals different from a main component metal of the internal electrode layer exist at different positions in a stacking direction of the dielectric layer and the internal electrode layer, between the dielectric layer and the internal electrode layer.

2. The ceramic electronic device as claimed in claim 1, wherein a section between the dielectric layer and the internal electrode layer is a section from a minimum differential value of a concentration of the main component metal of the internal electrode layer to a maximum differential value of a concentration of a constituent metal of a main component ceramic of the dielectric layer, when component element concentrations are measured from the internal electrode layer toward the dielectric layer.

3. The ceramic electronic device as claimed in claim 1, wherein a thickness of the dielectric layer is 0.6 μm or less.

4. The ceramic electronic device as claimed in claim 1, wherein an interval from an interface of the internal electrode layer to a concentration peak of a first metal among the two or more kinds of metals is 0.1 nm or more and 2 nm or less, between the dielectric layer and the internal electrode layer.

5. The ceramic electronic device as claimed in claim 4, wherein an interval from the concentration peak of the first metal to a concentration peak of a second metal among the two or more kinds of metals is 0.1 nm or more and 2 nm or less, between the dielectric layer and the internal electrode layer.

6. The ceramic electronic device as claimed in claim 5, wherein an interval from the concentration peak of the second metal to an interface of the dielectric layer is 0.1 nm or more and 2 nm or less, between the dielectric layer and the internal electrode layer.

7. The ceramic electronic device as claimed in claim 1, wherein a main component metal of the internal electrode layer is Ni.

8. The ceramic electronic device as claimed in claim 1, wherein the dielectric layer includes barium titanate.

9. The ceramic electronic device as claimed in claim 1, wherein the concentration peaks of the two or more types of metals include a concentration peak of Au and a concentration peak of Sn.

10. A manufacturing method of a ceramic electronic device comprising:
  forming a plurality of stack units by forming each of internal electrode patterns on each of dielectric green sheets;
  forming a multilayer structure by stacking the plurality of stack units; and
  firing the multilayer structure,
  wherein metal patterns each of which is made of one of two or more types of metals different from a main component metal of the internal electrode pattern are formed on both main faces of the internal electrode pattern by sputtering, in the forming of the internal electrode pattern.

* * * * *